Figure 1:
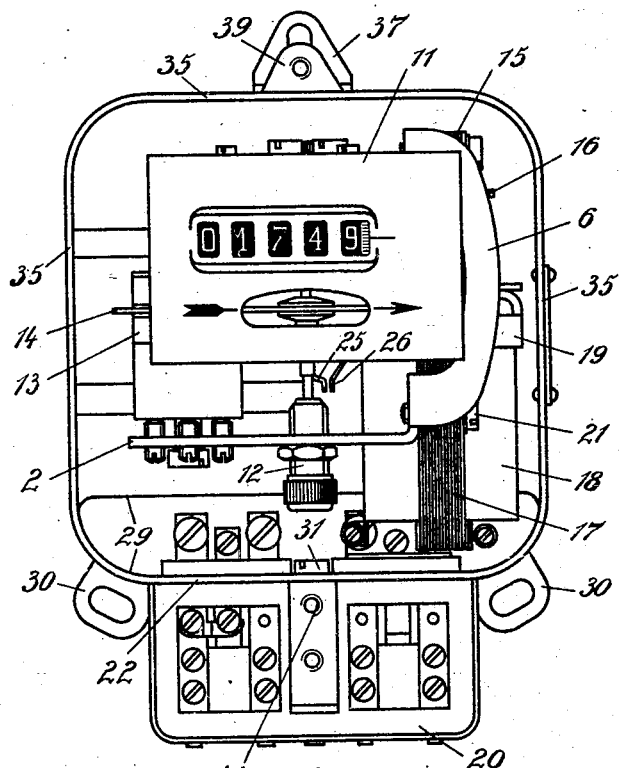

Oct. 11, 1927.  
K. SINGER ET AL  
1,645,299  
ELECTRICITY METER  
Filed July 24, 1925  
4 Sheets-Sheet 1

INVENTORS.  
Konrad Singer  
Paul Paschen &  
Georg Reime.

By  
ATTORNEY

INVENTORS.
Konrad Singer
Paul Paschen &
Georg Reime.

Oct. 11, 1927.

K. SINGER ET AL 1,645,299

ELECTRICITY METER

Filed July 24, 1925

4 Sheets-Sheet 3

INVENTORS
Konrad Singer
Paul Paschen &
Georg Reime.

By Wesley G. Carr

ATTORNEY

Oct. 11, 1927.

K. SINGER ET AL 1,645,299

ELECTRICITY METER

Filed July 24, 1925 4 Sheets-Sheet 4

INVENTORS
Konrad Singer
Paul Paschen &
Georg Reime.

By.

ATTORNEY

Patented Oct. 11, 1927.

1,645,299

UNITED STATES PATENT OFFICE.

KONRAD SINGER, PAUL PASCHEN, AND GEORG REIME, OF NUREMBERG, GERMANY, ASSIGNORS TO WESTINGHOUSE ELECTRIC & MANUFACTURING COMPANY, OF NEW YORK, N. Y., A CORPORATION.

ELECTRICITY METER.

Application filed July 24, 1925, Serial No. 45,904, and in Germany March 19, 1924.

Our invention relates to improvements in electricity meters of the induction type. It consists in particular in the arrangement of the electromagnets and the arrangement and construction of the parts of the frame on which these electromagnets, the disc armature rotatable in two bearings, the brake magnet and the counting train of such a meter are supported. Other improvements will appear in the course of the specification and will be set out in the claims.

In a well known type of such a meter two electromagnets are employed. One of them is arranged above the disc armature and the other below it. One of these electromagnets is the voltage magnet and the other is the current magnet. The connection between the windings of the electromagnets and the mains of the plant is effected by means of the terminal board of the meter. The terminals pass through the wall of the meter casing into the interior of the casing and are, at their inner ends, connected to the windings of the electromagnets and, at their outer ends, to the line wires.

Usually the heights of the electromagnets of the meter, that means their dimensions in a direction parallel to the axis of the armature are very different. The voltage magnet is generally the higher of the two, but the conditions may also be reversed.

The object of the special arrangement of the electromagnets and the frame according to our invention is to bring about a considerable reduction in the proportions of the meter considerably below the hitherto customary dimensions and yet to retain such an arrangement of the parts that they remain easily accessible in all places which it may be desirable to reach during the installation, the testing or the repair of the meter.

We have with this arrangement succeeded in constructing a meter which while possessing all the qualities demanded of an efficient meter has an approximately cubic shape of a volume not much larger than one cubic decimetre.

With this object in view we arrange the upper electromagnet, usually the voltage magnet, upon the side of the disc armature facing the terminal board and dispose that part of the frame which supports the bearing of the armature at this side of the disc armature in a plane which passes at least approximately through the centre of gravity of the said electromagnet. The lower electromagnet, usually the main magnet, we dispose on the side of the disc armature farthest away from the terminal board and that part of the frame which supports the bearing of the armature at this side of the disc armature we place into a plane which in relation to the armature disc lies approximately symmetrical to that plane in which is situated the part of the frame which supports the other bearings.

With this arrangement of the said parts we are still at liberty to choose different places for the brake magnet and the counting train. We prefer to construct and arrange the brake magnet in such a manner that it is located with its larger portion on the side of the disc armature facing the terminal board and place the counting train of the meter on the other side of the disc armature farthest away from the terminal board.

A meter with this arrangement of the parts is illustrated by way of example on the drawings affixed to our specification and forming part thereof.

In the drawings is:—

Figure 2:
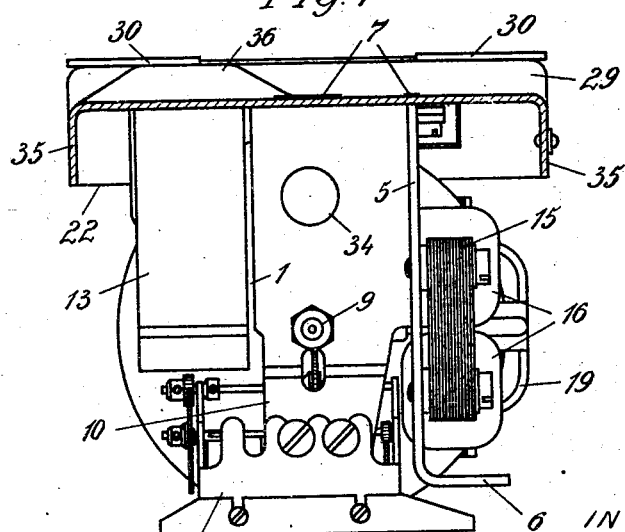
Figure 3:
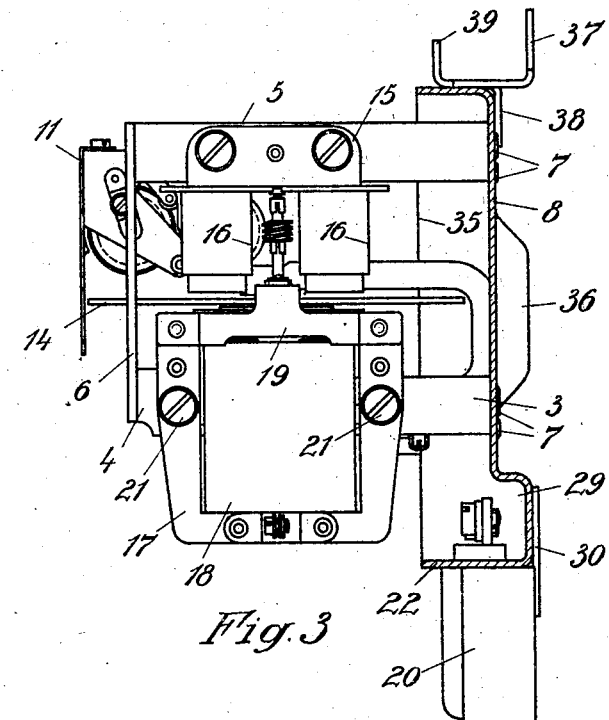
Figure 4:
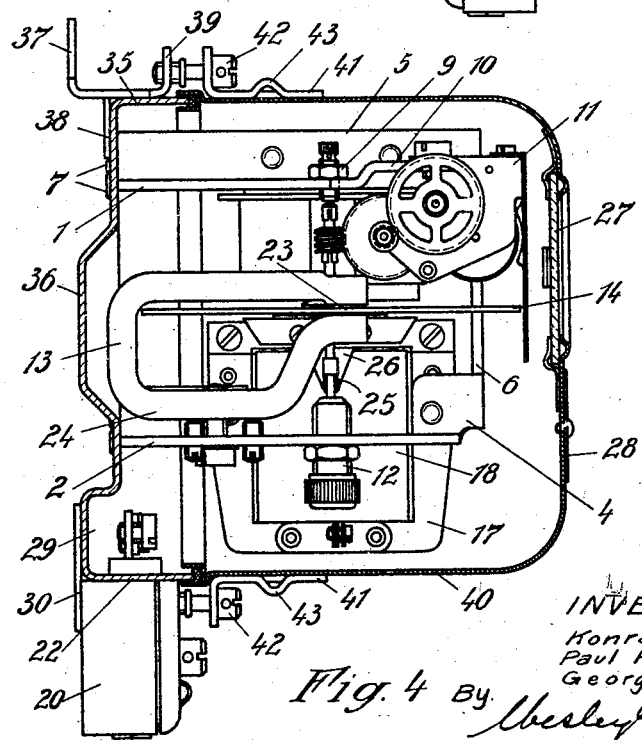
Figure 5:
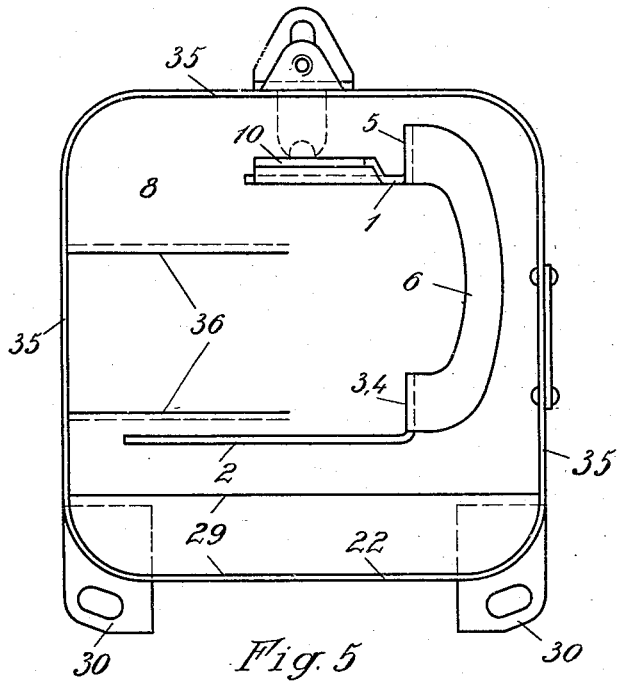
Figure 6:
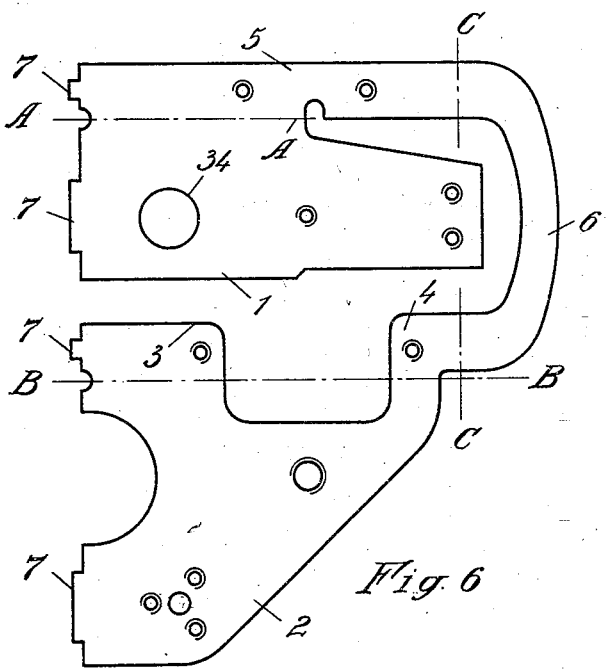
Figure 7:
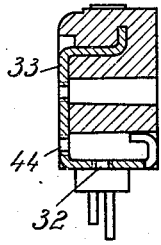
Figure 8:
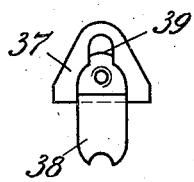
Figure 9:
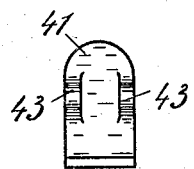
Figure 10:
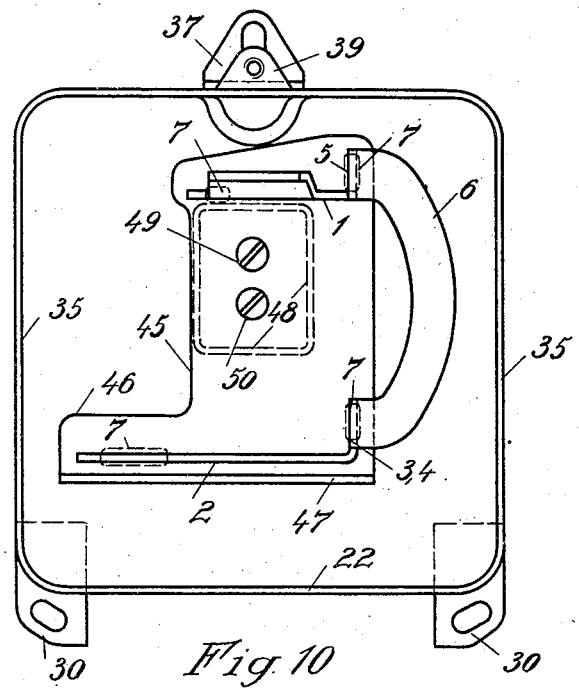
Figure 11:
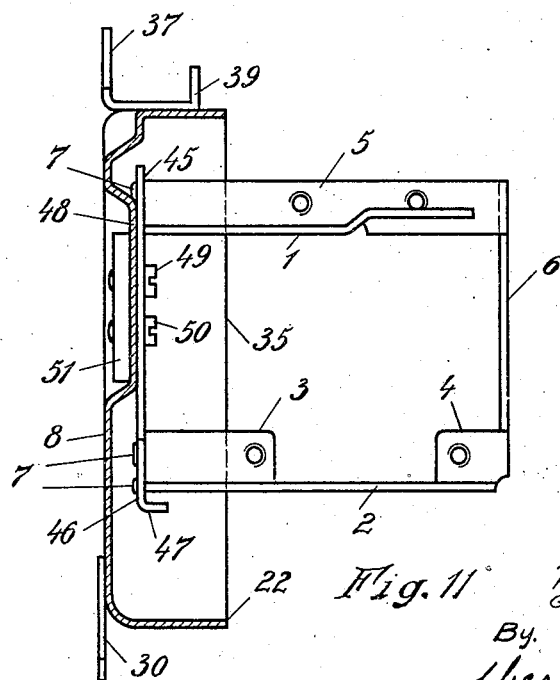

Fig. 1, a front-elevation of the meter with the top part of the housing removed, Fig. 2, a sectional plan, Fig. 3, a view from the right-hand side of Fig. 1, partly in section, Fig. 4, a view of the meter from the left-hand side of Fig. 1, with the complete housing in section, Fig. 5, a front-elevation of the bottom part of the housing with the frame, according to Fig. 1, but on a smaller scale, Fig. 6, a development of the frame, Fig. 7, a cross-section through the terminal board, Fig. 8, a rear view of the suspension eye, Fig. 9, a plan of the fixing angles at the top part of the housing shown in side-elevation in Fig. 4, Fig. 10, a front elevation of a modified frame and base plate, corresponding with Fig. 5 and Fig. 11, a side-elevation of Fig. 10, the bottom part of the housing being shown in section.

Like parts are indicated by like numbers of reference throughout all the figures of the drawings.

For the construction of the frame a piece of sheet metal is employed which is punched from a blank and has the shape or configuration shown in Fig. 6. This piece is bent at right angles along the lines A—A, B—B and C—C in such a manner that the parts 1 and 2 stand up in front of the plane of the parts 3, 4 and 5 while the part 6 stands up at the back of this plane. The thus prepared piece of sheet metal is then riveted into the bottom 8 of the lower part of the housing by means of the tongues or pins 7.

The thus constructed frame supports, by the part 1 the bearing screw 9 and at the forward slightly turned up end 10 of the same part the counting train 11. The part 2 supports the other bearing screw 12 and the brake magnet 13 which is secured in place in known manner by means of three supporting screws and one tension screw. The parts 5, 6, 3 and 4, the two latter ones connected by the part 2, form together a support for the electromagnets projecting from the bottom part of the housing.

The disc armature 14 is located at about the middle of the bearing screw supports 1 and 2. The main magnet 15 with the main current coils 16 is fixed upon one side of the disc armature upon the part 5 of the frame. The three-armed voltage magnet 17 with the voltage coil 18 and the bow-shaped part 19 is arranged at the other side of the disc armature which faces the terminal board 20. The voltage magnet is bolted to the parts 3 and 4 of the frame in proximity to its centre of gravity by the two screws 21. The plane of the bearing screw support which is directly joined to the parts 3 and 4 of the frame passes at least approximately through the centre of gravity of the voltage magnet. Between the bearing screw support 2 and the lower flange 22 of the bottom part of the housing ample free space remains in which the internal screws of the terminal board and the (not shown) connecting wires of the electro-magnet coils are easily accessible.

In the brake magnet 13 the gap 23 is situated high above the limb 24 serving for the attachment of said magnet. Hereby the stopping vane 25 upon the armature and the tongue 26 upon the voltage magnet with which it cooperates remain easily accessible for regulating the starting sensitiveness.

This arrangement of the parts has the result that the window 27 (Fig. 4) in front of the counting train and the edge of the disc armature take up the upper half of the cover of the top part of the housing so that the bottom half remains vacant for the shield 28.

The bottom part of the housing is drawn from sheet metal and has at the side of the terminal board 20 a recess or sunk part 29. At its bottom are welded the fixing eyes 30.

The terminal board 20 is supported by these eyes and extends with pins into which the terminal bars are embedded through openings in the flange 22 into the interior of the bottom part of the housing and is secured in position by a screw 31, Fig. 1 introduced from the inside. This screw has its female thread at 32 in a metal part 33, Fig. 7, which is pressed into or embedded in the terminal board body made of insulating material. The screw 31 is prior to the insertion of the armature accessible for the screw driver through the opening 34 in the bearing screw support 1.

The recess or sunk part 29 serves the purpose to give the flange 22 that height which corresponds with the thickness of the terminal board and yet to keep the flange 35 at the other three sides of the bottom part of the housing low so that the accessibility of the operative parts of the motor of the meter is not interfered with.

At the back of the brake magnet 13 a further recess 36 is produced in the bottom 8 of the bottom part of the housing which increases the space for the housing and the adjustment of the brake magnet.

The suspension eye 37 is set back into the plane of the eyes 30 at the bottom of the recess 29. It is welded to the flange 35 and by means of a tongue 38 to the bottom 8 of the bottom part of the housing. A second tongue 39 bent up parallel to the plane of the bottom part of the housing serves for the attachment of the top part of the housing.

The top part 40 of the housing is not attached to the bottom part of the housing at the sides, as usual, but at the top and at the bottom. To the top part of the housing are welded angle irons 41 through the flanges of which pass the fixing screws 42. From their welded on parts strips 43 are cut out and bent up to form eyes through which the cords for the lead seals of the fixing screws may be drawn. Of these screws one has its female thread in the tongue 39 of the suspension eye 37 the other at 44 in the metal insertion 33 of the terminal board.

In the hitherto described construction of the meter the frame, parts 1 to 7 and 10 is directly fixed upon the bottom 8 of the bottom part of the housing. In this method of fixing, the base plate of the housing, formed by the bottom of the bottom part of the housing, is utilized to ensure also the correct relative position of the parts of the frame, to one another.

In the modified construction of the meter illustrated in the Figures 10 and 11 the bottom of the bottom part of the housing is freed from this task so that it serves only as suspension for the frame with the parts fixed upon it and in cooperation with the other parts of the housing as enclosure for the frame with its attached parts. For this purpose the frame has been furnished with a particularly small base plate which is called frame base plate and serves for attaching the frame at the bottom part of the housing.

The frame is riveted into the small frame base plate 45 which is punched out of strong sheet metal by means of tongues 7. The plate has at its lower end a lateral extension 46 into which is riveted the tongue at the lower bearing screw support 2 of the frame. The lower edge 47 of the frame base plate 45 is bent at right angles to the plane of the plate in order to stiffen the plate within the reach of the frame part 2.

The frame is fixed by its base plate 45 at an embossed hump 48 of the substantially flat bottom 8 of the bottom part of the housing. The screws 49 and 50 in cooperation with a metal piece 51 inserted into the cavity of the hump 48 and provided with the female thread for the screws serve for attaching the frame.

This modification of the frame offers the advantage that the strength of the frame becomes independent of the quality of the comparatively thin and soft sheet metal from which the bottom part of the housing is drawn.

It will be readily understood that the details of our invention may be modified within the ambit of our claims without departing from the spirit of our invention or sacrificing any of its advantages.

What we claim as our invention and desire to secure by Letters Patent is:—

1. In an electricity meter of the induction type, the combination of a housing comprising a bottom-portion and a top-portion, a frame fastened to the bottom-portion of said housing, a disc armature rotatably mounted in bearings supported by parts of said frame, a voltage electromagnet and a main-electromagnet both fastened to said frame in such a manner that a gap for said disc armature is formed between them, a brake magnet fastened to said frame and adapted to receive said disc in its gap, a counting train fastened to said frame and in operative connection with said armature, a terminal board inserted in an opening of the wall of said housing adapted to connect the windings of said electromagnets to the lines of the plant to be controlled by said meter, one of said electromagnets extending farther than the other in the direction parallel with the armature axis and being arranged on the side of the disc facing the terminal board, the part of the frame supporting the armature bearing on this side of said disc being arranged in a plane substantially parallel with said disc and in proximity to the centre of gravity of the said electromagnet, the part of the frame which supports the other bearing of said armature being arranged in a plane substantially parallel with said disc and at a distance therefrom which is at least approximately equal to the distance between said disc and the other part of said frame supporting the other bearing.

2. In an electricity meter of the induction type, the combination of a housing comprising a bottom-portion and a top-portion, a frame fastened to the bottom-portion of said housing, a disc armature rotatably mounted in bearings supported by parts of said frame, a voltage electromagnet and a main electromagnet both fastened to the frame in such a manner that a gap for said disc armature is formed between them, a brake magnet fastened to said frame and adapted to receive said disc in its gap, a counting train fastened to said frame and in operative connection with said armature, a terminal board inserted in an opening of the wall of said housing adapted to connect the windings of the electromagnets to the lines of the plant to be controlled by said meter, the voltage electromagnet, extending farther than the main-electromagnet in the direction parallel with the armature axis and being arranged on the side of the disc facing the terminal board, the part of the frame supporting the armature bearing on this side of said disc being arranged in a plane substantially parallel with said disc and in proximity to the centre of gravity of said voltage electromagnet, the part of the frame which supports the other bearing of the armature being arranged in a plane substantially parallel with said disc and at a distance therefrom which is at least approximately equal to the distance between the disc and the other part of said frame supporting the other bearing.

3. In an electricity meter of the induction type, the combination of a housing comprising a bottom-portion and a top-portion, a frame fastened to the bottom-portion of said housing, a disc armature rotatably mounted in bearings supported by parts of the frame, a voltage electromagnet and a main electromagnet both fastened to the frame in such a manner that a gap for said disc armature is formed between them, a brake magnet fastened to said frame and adapted to receive the disc in its gap, a counting train fastened to said frame and in operative connection with said armature, a terminal board inserted in an opening of the wall of said housing adapted to connect the windings of the electromagnets to the lines of the plant to be controlled by said meter, one of said electromagnets extending farther than the other in the direction parallel with the armature axis and being arranged on the side of the disc facing the terminal board, the part of the frame supporting the armature bearing on this side of said disc being arranged in a plane substantially parallel with said disc and in proximity to the centre of gravity of the said electromagnet, the part of the frame which supports the other bearing of said armature being arranged in a plane substantially parallel with said disc and at a distance therefrom which is at least approximately equal to the distance between said disc and the other part of the frame supporting the other bearing, said brake magnet being fastened to the part of said frame which supports the bearing on the terminal board side of said disc and said counting train being fastened to the other part of said frame supporting the other bearing.

4. In an electricity meter of the induction type, the combination of a housing having a bottom-portion and a top-portion, a frame fastened to the bottom-portion of said housing, a disc armature rotatably mounted in bearings supported by parts of said frame, a voltage-electromagnet and a main-electromagnet both fastened to said frame in such a manner that a gap for said disc is formed between them, a brake magnet fastened to said frame and adapted to receive said disc in its gap, a counting train fastened to said frame in operative connection with said armature, a terminal board inserted in an opening of the wall of said housing for connecting the windings of the electromagnets to the lines of the plant to be controlled by the meter, the said frame consisting of an angularly bent sheet metal punching, comprising a bow-shaped part with seats for the electromagnets and two parts for holding the armature bearings, said two parts bent off at right angles from said bow-shaped part, one of them bent out of said bow-shaped part, the three parts of said frame being fastened to the bottom-portion of said housing by their edges adjacent to the open side of said bow-shaped part, one of said electromagnets, extending farther than the other in the direction parallel with the armature axis and being arranged on the side of said disc facing the terminal board, the part of said frame supporting the armature bearing on this side of said disc being arranged in a plane substantially parallel with said disc and in proximity to the centre of gravity of the said electromagnet, the part of the frame supporting the other bearing of said armature being arranged in a plane substantially parallel with said disc and at a distance therefrom which is at least approximately equal to the distance between said disc and the other part of said frame supporting the other bearing.

5. In an electricity meter of the induction type, the combination of a housing having a bottom-portion and a top-portion, a frame fastened to the bottom-portion of said housing, a disc armature rotatably mounted in bearings supported by parts of said frame, a voltage-electromagnet and a main-electromagnet both fastened to said frame in such a manner that a gap for said disc armature is formed between them, a brake magnet fastened to said frame and adapted to receive said disc in its gap, a counting frame fastened to said frame in operative connection with said armature, a terminal board inserted in an opening of the wall of said housing adapted to connect the windings of said electromagnets to the lines of the plant to be controlled by said meter, the said frame consisting of an angularly bent sheet metal punching, comprising a bow-shaped part with seats for said electromagnets and two parts for supporting said armature bearings, said two parts bent off at right angles from said bow-shaped part, one of them bent out of said bow-shaped part, the three parts of said frame being fastened to the bottom-portion of said housing by means of a base plate, to which are fastened the edges of the three parts adjacent to the open side of said bow-shaped part, one of said electromagnets extending farther than the other in the direction parallel with the armature axis and being arranged on the side of said disc facing the terminal board, the part of the frame supporting the armature bearing on this side of said disc being arranged in a plane substantially parallel with said disc and in proximity to the centre of gravity of the said electromagnet, the part of the frame supporting the other bearing of said armature being arranged in a plane substantially parallel with said disc and at a distance therefrom which is at least approximately equal to the distance between said disc and the other part of said frame supporting the other bearing.

6. In an electricity meter of the induction type, the combination of a housing comprising a bottom-portion and a top-portion, approximately of one cubic decimetre in volume and of cubic shape, a frame fastened to the bottom-portion of said housing, a disc armature rotatably mounted in bearings supported by different parts of said frame, a voltage-electromagnet and a main-electromagnet both fastened to said frame in such a manner that a gap for said disc is formed between them, a brake magnet fastened to said frame and adapted to receive said disc in its gap, a counting train fastened to the frame and in operative connection with said armature, a terminal board inserted in an opening of the wall of said housing adapted to connect the windings of said electromagnets to the lines of the plant to be controlled by said meter, one of said electromagnets extending farther than the other in the direction parallel with the armature axis and being arranged on the side of said disc facing the terminal board, the part of the frame supporting the armature bearing on this side of said disc being arranged in a plane substantially parallel with said disc and in proximity to the centre of gravity of the said electromagnet, the part of the frame supporting the other bearing of said armature being arranged in a plane substantially parallel with said disc and at a distance therefrom which is at least approximately equal to the distance between said disc and the other part of said frame supporting the other bearing.

In testimony whereof we affix our signatures.

KONRAD SINGER.
PAUL PASCHEN.
GEORG REIME.